United States Patent
Howell et al.

(10) Patent No.: US 7,591,335 B2
(45) Date of Patent: Sep. 22, 2009

(54) CHILDREN'S RIDE-ON VEHICLES HAVING GROUND DETECTION SYSTEMS

(75) Inventors: William R. Howell, Arcade, NY (US); John Rhein, Chula Vista, CA (US); Gerald P. Sitarski, Grand Island, NY (US); Richard A. Zirnheld, Niagara Falls, NY (US); Jeffrey W. Reynolds, East Aurora, NY (US)

(73) Assignee: Mattel, Inc., El Segundo, CA (US)

( * ) Notice: Subject to any disclaimer, the term of this patent is extended or adjusted under 35 U.S.C. 154(b) by 209 days.

(21) Appl. No.: 11/510,226

(22) Filed: Aug. 24, 2006

(65) Prior Publication Data
US 2008/0011527 A1    Jan. 17, 2008

Related U.S. Application Data

(60) Provisional application No. 60/830,975, filed on Jul. 13, 2006.

(51) Int. Cl.
*B60K 1/02*     (2006.01)
*B60K 28/16*    (2006.01)

(52) U.S. Cl. .................. 180/197; 180/65.51; 180/282; 447/466; 701/22

(58) Field of Classification Search .............. 180/197, 180/282–285, 65.5, 65.6, 65.8, 907, 908, 180/65.51, 65.1; 701/22, 82; 446/434, 441, 446/457, 466, 468
See application file for complete search history.

(56) References Cited

U.S. PATENT DOCUMENTS

| | | | |
|---|---|---|---|
| 1,681,608 A | 8/1928 | Clark | |
| 1,901,554 A | 3/1933 | De Wilde | |
| 2,613,756 A | 10/1952 | Smith | |
| 2,842,630 A | 7/1958 | Lucibello | |
| 3,116,806 A | 1/1964 | Rose | |
| 3,229,109 A | 1/1966 | Wilson | |

(Continued)

FOREIGN PATENT DOCUMENTS

DE    3417328    11/1985

(Continued)

OTHER PUBLICATIONS

English-language abstract of German Patent No. DE 19532521, 1997.

(Continued)

*Primary Examiner*—Anne Marie M Boehler
(74) *Attorney, Agent, or Firm*—Dascenzo Intellectual Property Law, P.C.

(57) ABSTRACT

Children's ride-on vehicles having a drive assembly that is selectively configured between a plurality of drive configurations, such as responsive to user inputs via user input devices, and a ground detection system that is adapted to detect when at least one of a plurality of wheels loses contact with the ground surface. The ground detection system may be adapted to restrict the plurality of drive configurations responsive thereto. This restriction may be automatic responsive to loss of contact of the at least one of the plurality of wheels with the ground surface, and it may be made regardless, or independent, of user inputs that otherwise would select and/or enable one of the restricted drive configurations.

31 Claims, 7 Drawing Sheets

U.S. PATENT DOCUMENTS

| | | |
|---|---|---|
| 3,763,956 A | 10/1973 | Ruff |
| 3,772,643 A | 11/1973 | Dodd et al. |
| 3,871,473 A | 3/1975 | Castonguay |
| 3,885,112 A | 5/1975 | Duncan |
| 4,144,422 A | 3/1979 | Ramos |
| 5,222,568 A * | 6/1993 | Higasa et al. ............... 180/65.5 |
| 5,249,851 A * | 10/1993 | Johnsen ...................... 303/150 |
| 5,389,824 A | 2/1995 | Moroto et al. |
| 5,439,071 A * | 8/1995 | Rodriguez-Ferre .......... 180/167 |
| 5,492,192 A * | 2/1996 | Brooks et al. ............... 180/165 |
| 5,508,924 A * | 4/1996 | Yamashita ................... 701/22 |
| 6,416,381 B1 | 7/2002 | Walter et al. |
| 6,423,914 B1 | 7/2002 | Burnett |
| 6,470,982 B2 * | 10/2002 | Sitarski et al. ............. 180/65.1 |
| 6,491,122 B2 | 12/2002 | Leitner et al. |
| 6,701,893 B2 | 3/2004 | Isoda et al. |
| 6,771,034 B2 * | 8/2004 | Reile et al. .................. 318/139 |
| 6,938,717 B2 | 9/2005 | Gaudiano |
| 2002/0063047 A1 | 5/2002 | Burnett |
| 2002/0121395 A1 * | 9/2002 | Norman et al. ............ 180/65.1 |
| 2005/0161274 A1 | 7/2005 | Tsuruta |
| 2005/0252700 A1 | 11/2005 | Kitauchi et al. |
| 2005/0275516 A1 | 12/2005 | Lang |
| 2006/0022812 A1 | 2/2006 | Lang |
| 2006/0175101 A1 * | 8/2006 | Drosendahl et al. ........ 180/65.1 |

FOREIGN PATENT DOCUMENTS

| | | |
|---|---|---|
| DE | 19532521 | 3/1997 |
| WO | WO 94/05029 | 3/1994 |

OTHER PUBLICATIONS

English-language machine translation of German Patent No. DE 19532521, 1997.
English-language abstract of German Patent No. DE 3417328, 1985.
International Search Report, Aug. 21, 2008, 4 pages, U.S. Patent and Trademark Office.
Written Opinion, Aug. 21, 2008, 5 pages, U.S. Patent and Trademark Office.

\* cited by examiner

CHILDREN'S RIDE-ON VEHICLES HAVING GROUND DETECTION SYSTEMS

RELATED APPLICATION

The present application claims priority to U.S. Provisional Patent Application Ser. No. 60/830,975, which was filed on Jul. 13, 2006, and the complete disclosure of which is hereby incorporated by reference herein for all purposes.

TECHNICAL FIELD

The present disclosure relates generally to children's ride-on vehicles, and more particularly to battery-powered children's ride-on vehicles with ground detection systems.

BACKGROUND OF THE DISCLOSURE

Children's ride-on vehicles are reduced-scale vehicles that are designed for use by children. For example, children's ride-on vehicles include at least one seat adapted to accommodate one or more children and steering and drive assemblies that are adapted to be operated by a child sitting on the seat. One type of drive assembly that is often used in children's ride-on vehicles includes a battery-powered motor assembly that is adapted to drive the rotation of one or more of the vehicle's wheels, such as responsive to inputs from the child sitting on the seat. The motor assembly is powered by a battery assembly, which may include one or more rechargeable batteries. Typically, the vehicle will include an actuator, such as a foot pedal, push button, or other user input device, which enables a child to select when power is delivered to the motor assembly. Some drive assemblies further include other user input devices, such as a speed selector and/or a direction selector, which are operated by a child sitting on the vehicle's seat to select the speed and direction at which the vehicle travels.

A child driver may drive the ride-on on a variety of terrains, which may include ground surfaces that are level, smooth, inclined, bumpy, tiered, sloped, rough, uneven, and/or combinations thereof. In maneuvering through a variety of terrains, one or more of the vehicle's wheels may lose contact with the ground surface. Conventional children's ride-on vehicles lack a system for detecting when the vehicle's wheels contact and/or lose contact with the ground surface, much less such a system that affects the operation of the drive assembly responsive, at least in part, to when the vehicle's wheels contact and/or lose contact with the ground surface.

DETAILED DESCRIPTION AND BEST MODE OF THE DISCLOSURE

Figure 1:
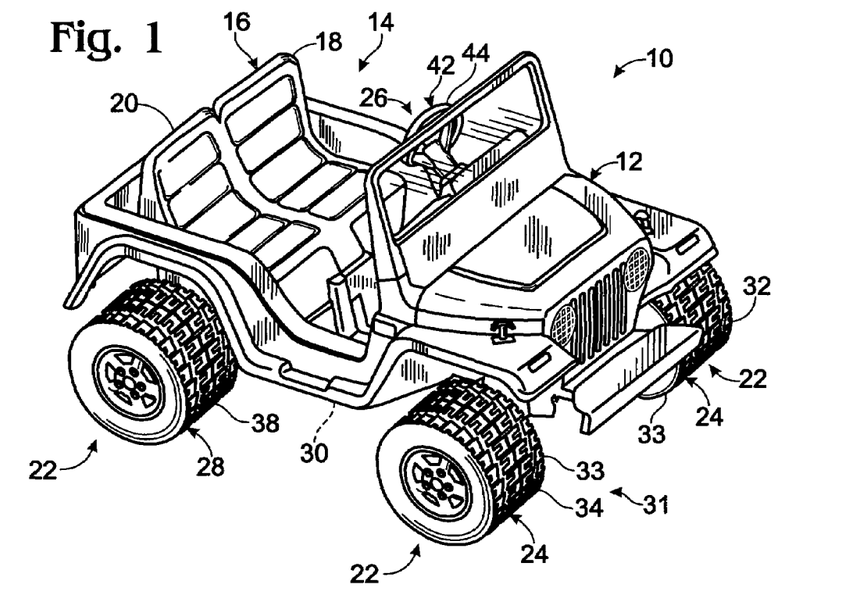
FIG. 1 is an isometric view of an illustrative, non-exclusive example of a children's ride-on vehicle with which a ground detection system according to the present disclosure may be used.

An illustrative, non-exclusive example of a children's ride-on vehicle is shown in FIG. 1 and indicated generally at 10. Ride-on vehicle 10 includes a support frame, or body, 12 that provides a riding space, or passenger compartment, 14 with a seat assembly 16 that is sized and configured to accommodate at least one child, including a child driver. Seat assembly 16 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use by a child driver or by a child driver and a child passenger. For example, in the illustrated embodiment, seat assembly 16 includes a pair of seats, or seating regions, 18 and 20, with seat 18 sized and positioned to receive a child driver and seat 20 sized and positioned to receive a child passenger.

Body 12 typically is formed from molded plastic and may be integrally formed or formed from a plurality of parts that are secured together by screws, bolts, clips, and/or other suitable fasteners. Body 12 may additionally, or alternatively, be at least partially formed from other suitable material(s), such as metal, wood, and/or composite materials. Body 12 may include, or be mounted upon, an underlying chassis, or chassis portion, on which the rest of the body (which may be referred to as a body portion) is supported. The chassis portion may be formed from the same or different materials as the rest of the body. When present, the chassis portion is often formed of metal and/or molded plastic, with the rest of the body often being formed of molded plastic. However, these illustrative examples of suitable materials of construction are not required.

As shown, body 12 is shaped to generally resemble a reduced-scale Jeep® vehicle. JEEP is a registered trademark of Chrysler, LLC, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft, and the like. However, it is also within the scope of the present disclosure that vehicle 10 may be shaped to resemble fantasy vehicles that do not have a corresponding adult-sized counterpart. Although vehicle 10 is depicted in the form of a reduced-scale Jeep® vehicle, it will be appreciated that the components and/or features of vehicle 10, including the subsequently described ground detection system, may be configured for use on any type of children's ride-on vehicle having one or more powered components.

Figure 2:
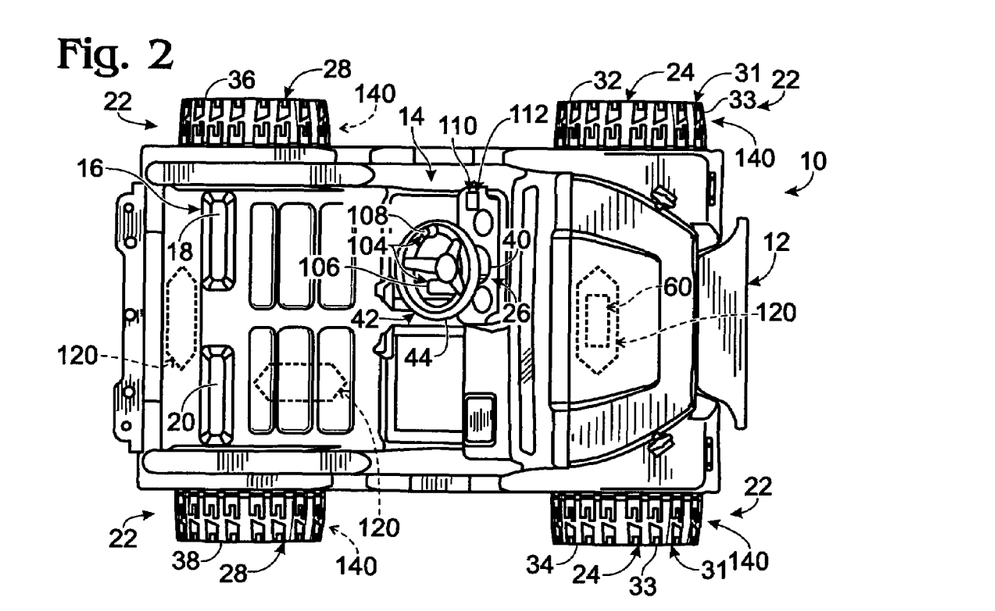
FIG. 2 is a top plan view of the vehicle of FIG. 1.

Ride-on vehicle 10 also includes a plurality of wheels 22 that are rotatably coupled to body 12 and adapted to contact a ground surface, as indicated in FIGS. 1-2. The plurality of wheels includes a steerable wheel assembly 24 that contains at least one steerable wheel that is adapted to be steered by the vehicle's steering assembly 26, typically at least partially in response to user-imparted steering inputs thereto. The plurality of wheels further includes a driven wheel assembly 28 that contains at least one driven wheel that is adapted to be rotationally driven by the vehicle's drive assembly 30. As used herein, the term "driven wheel" refers to a wheel that is rotated directly in response to a rotational input from the vehicle's drive assembly, which is either directly conveyed to the wheel by the output of the motor assembly or conveyed through a linkage, such as a gearbox, belt, chain, gear assembly, axle, or the like. Plurality of wheels 22 further includes at least one sensed wheel assembly 31 having at least one sensed wheel 33. As used herein, the term "sensed wheel" refers to a wheel that is sensed by, and/or in communication with, the vehicle's ground detection system, such as to determine when the sensed wheel is in contact with, and/or loses contact with, a ground surface upon which the vehicle is driven. It is within the scope of the present disclosure that a sensed wheel may also be a driven wheel, a steerable wheel, or a wheel that is neither driven nor steerable.

In the illustrated, non-exclusive example, vehicle 10 includes four wheels 22, with front wheels 32 and 34 forming steerable wheel assembly 24 and also sensed wheel assembly 31, and rear wheels 36 and 38 forming driven wheel assembly 28. The number of wheels on the vehicle may vary from two wheels to four, six or more wheels, although children's ride-on vehicles typically include at least three wheels for stability. Similarly, each wheel assembly must contain at least one wheel of the plurality of wheels, and a particular wheel may form all or a portion of the steerable wheel assembly, the driven wheel assembly, and/or the sensed wheel assembly. For example, it is within the scope of the disclosure that either or both of front wheels 32 and 34 or rear wheels 36 and 38 are driven, steerable, and/or sensed. Similarly, one front wheel and one rear wheel may be driven, steerable, and/or sensed. Additionally or alternatively, the vehicle may include one or more driven, steerable, and/or sensed wheels underneath its body that are generally hidden by, or housed within, the body of the vehicle.

A portion of the vehicle's steering assembly 26 is shown in FIGS. 1 and 2 and includes a steering column 40 (indicated in FIG. 2) and a steering mechanism 42. The steering assembly enables a child sitting on seat 18 to steer the vehicle's steerable wheel assembly 24 via user-applied steering inputs to steering mechanism 42, which is positioned on vehicle 10 for operation by a child sitting on seat 18. In the illustrated embodiment, steering mechanism 42 takes the form of a steering wheel 44. Other suitable structures, such as handlebars and steering levers, may be used and are within the scope of the present disclosure. Steering column 40 includes any suitable mechanical linkage that conveys a child's steering inputs from the steering mechanism to the vehicle's steerable wheel assembly, thereby steering the vehicle. As an illustrative, non-exclusive example, the steering column may include an end portion distal the steering mechanism, with this end portion being coupled via a suitable tie rod or steering linkage, to steering collars, or steering levers, associated with one or more steerable wheels of the ride-on vehicle's steerable wheel assembly.

Figures 3, 4:
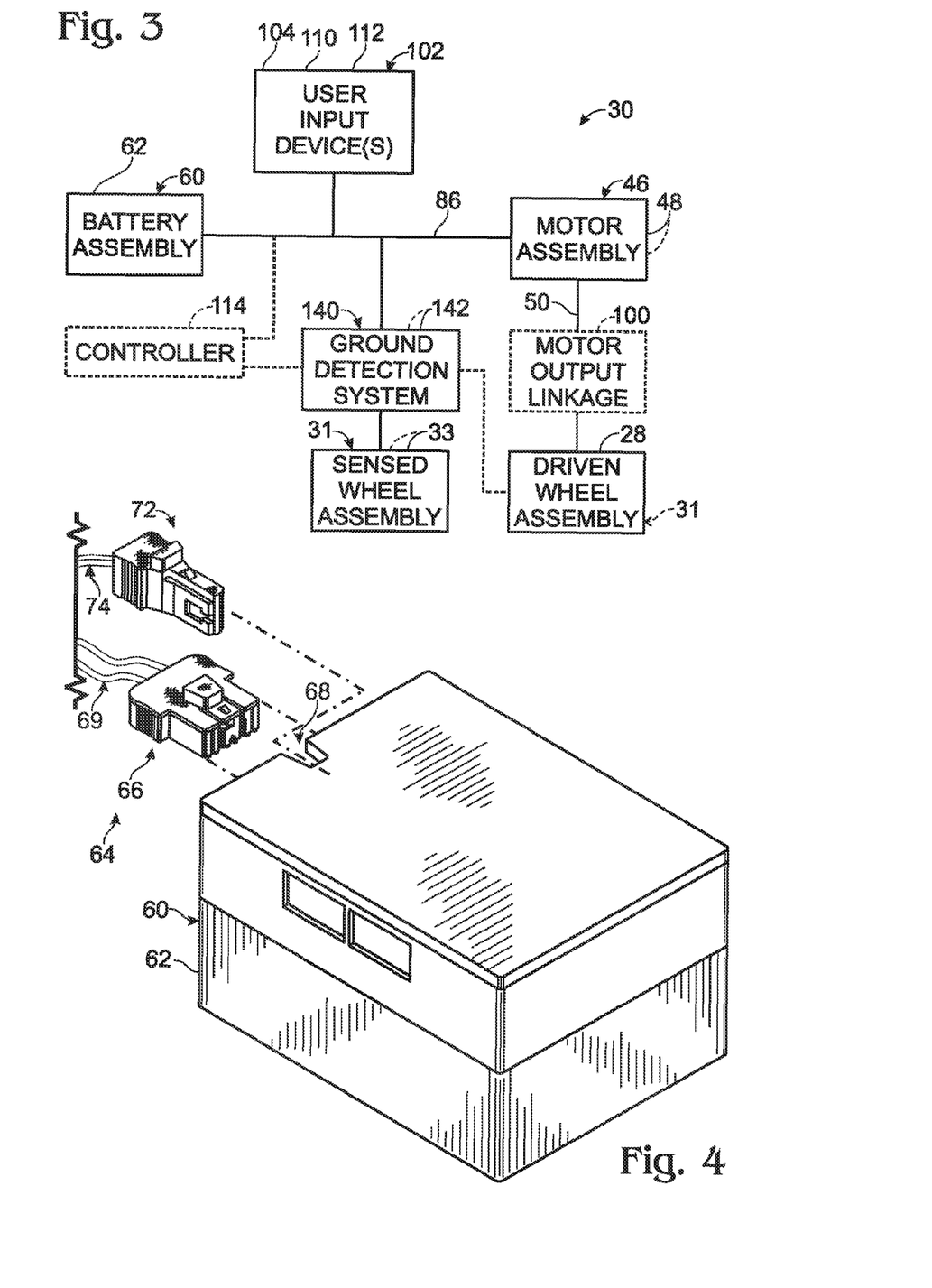
FIG. 3 is a schematic diagram of a suitable drive assembly for a children's ride-on vehicle according to the present disclosure, such as the vehicle of FIG. 1.
FIG. 4 is a perspective view of an illustrative battery assembly with portions of the vehicle's wiring harness and charger shown in fragment.

In FIG. 3, a non-exclusive example of a suitable drive assembly 30 for a children's ride-on vehicle, such as vehicle 10, is schematically illustrated. Drive assembly 30 is adapted to drive the rotation of driven wheel assembly 28. The drive assembly includes a motor assembly 46, which includes at least one electric motor 48 that is adapted to drive the rotation of at least one of the driven wheels of the plurality of wheels. The motor assembly includes an output 50 that provides a rotational input to the driven wheel assembly. Typically, the output 50 from each of the one or more motors includes a rotating shaft and/or a rotation pinion or output gear. Output 50 may include more than one shaft, pinion, and/or gear, such as when motor assembly 46 includes more than one motor and/or when driven wheel assembly 28 includes more than one driven wheel. Illustrative, non-exclusive examples of suitable motors are disclosed in U.S. patent application Ser. No. 11/341,034, the complete disclosure of which is hereby incorporated by reference for all purposes. Motor assembly 46 also may be configured to power other moveable components on vehicle 10, such as depending on the form of the vehicle. For example, the motor assembly may be coupled to raise and lower the blade of a ride-on that resembles a bulldozer, the bucket of a ride-on that resembles a skid-steer or other loader, the bed of a ride-on that resembles a dump truck, etc.

Power for the motor assembly is provided by any suitable power source. An illustrative example of a suitable power source is a battery assembly 60. Battery assembly 60 includes at least one battery 62 that is adapted to provide power to the motor assembly. Any suitable type and number of batteries may be used in battery assembly 60. Although not required, the batteries may be rechargeable batteries. For example, one or more six-, twelve-, eighteen-, or twenty-four-volt batteries have proven effective. An illustrative example of a battery assembly 60 is shown in FIG. 4. Also shown in FIG. 4 is a connector assembly 64 that is adapted to transmit power from the battery assembly to the motor assembly by providing an electrical connection between the battery assembly and the motor assembly, typically through the vehicle's wiring harness. Thus, the motor assembly is operably connected to the battery assembly by any suitable electrical connectors, such as cables, wires, or positive and negative terminals or leads, and the like.

In the illustrative battery assembly shown generally in FIG. 4, the connector assembly includes a plug 66 that fits into a socket 68 that is electrically connected to the battery assembly. The battery assembly 60 may optionally include a charging jack 70 that is configured to receive a charging probe 72. The plug and probe connect to wires, or electrical cables, 74 that transmit electrical power from the battery assembly to the motor assembly. It is within the scope of the present disclosure that vehicle 10 may include any other suitable structure for conducting electrical power from the battery assembly to the motor assembly, with the battery assembly of FIG. 4 merely providing an illustrative example. For example, the battery assembly may include one or more batteries that include a connector that extends, typically via a wired connection, from the battery's housing instead of the internal socket 68 depicted in FIG. 4. Illustrative, non-exclusive examples of suitable batteries for children's ride-on vehicles are disclosed in U.S. Pat. No. 6,509,719, the complete disclosure of which is hereby incorporated by reference for all purposes.

In FIG. 3, drive assembly 30 is shown further including an optional motor output linkage 100 that mechanically interconnects the motor assembly with the driven wheel assembly. Motor output linkage 100 is any suitable mechanism that transmits the rotational input from the motor assembly's output(s) to the driven wheel assembly. Examples of suitable linkages 100 include an intermediate linkage between the output and the driven wheel assembly, such as a gearbox containing one or more gears, a belt or chain drive, a worm gear, one or more individual gears, and the like. The motor output linkage may be adapted to transmit the rotational input from the motor assembly to the driven wheel assembly at the same relative rate of rotation, or it may mechanically augment the rotational input to convey a greater or lesser rate of rotation relative to the rate of rotation of the output of the motor assembly. It is also within the scope of the disclosure that drive assembly 30 may be formed without motor output linkage 100, in which case the output(s) 50 of the motor assembly directly transmit the rotational input to the driven wheel assembly.

Drive assembly 30 also includes one or more user input devices 102 that are adapted to convey inputs from a child sitting on the vehicle's seat, such as seat 18, to the vehicle's drive assembly. User input devices 102 also may be referred to as user control devices. These devices convey a user's inputs, such as via the vehicle's wiring harness 86. An illustrative example of a user input device is a drive actuator 104, which is adapted to selectively energize the vehicle's motor assembly responsive to a user, such as a child sitting on the vehicle's seat, manipulating, or otherwise actuating the input device. In other words, drive actuator 104 is adapted to receive a user input directing the battery assembly to actuate or otherwise energize the motor assembly, such as to cause the ride-on vehicle to be in an energized drive configuration instead of a de-energized drive configuration. Illustrative examples of suitable drive actuators 104 include an on/off switch, a foot pedal, a throttle lever, and a rotational handgrip on a steering mechanism that includes a handlebar. In FIG. 2, an example of a drive actuator 104 is shown in the form of a foot pedal 106 positioned for actuation by a child sitting on seat 18. When the drive actuator takes a form other than a foot pedal, it may be located in any suitable location within or near passenger compartment 14 so that a child sitting on seat 18 may reach the actuator while positioned to operate the vehicle. For example, an on/off switch or throttle may be located on the body or on the steering mechanism, such as illustrated at 108 in FIG. 2. Although a pair of drive actuators is illustrated in FIG. 2, the drive assembly will often only include a single drive actuator. The drive actuators may enable a user to select within a range of actuations/speeds (such as with a throttle), or simply to select whether or not the motor assembly is energized, such as with an on/off switch.

The user inputs, such as conveyed via user input device(s) 102, also may be adapted to select, or configure, the drive assembly within a plurality of drive configurations. These user inputs may be referred to as configuration inputs and are adapted to enable, or select, one or more of a plurality of drive configurations. Similarly, the user input devices utilized to receive the configuration inputs from a user, such as a child sitting on the ride-on vehicle's seat, may be referred to as configuration input devices. These drive configurations may be realized, or implemented, when the motor assembly is energized, such as responsive to actuation/energization of the motor assembly by the battery assembly. For example, the plurality of drive configurations may include one or more of the direction (forward or reverse) in which the drive assembly will propel the vehicle upon energization of the motor assembly, the relative speed or range of speed which the motor assembly is configured/energized to provide, and/or whether the drive assembly is able to be actuated responsive to an actuation input to a drive actuator 104.

For example, speed drive configurations, such as "high" and "low" speed configurations, "high," "medium," and "low" speed configurations, etc., may be selected with one or more user input devices 102 in the form of a speed switch 110. These speed drive configurations may be realized (i.e., the vehicle may be propelled according to the selected speed drive configuration) upon actuation or energization of the motor assembly. As the illustrative descriptions used above imply, the speed drive configurations may include a plurality of relative speed configurations, such as a first speed configuration, a second speed configuration that is greater than the first speed configuration, and optionally at least a third or more speed configurations that is/are greater than the second speed configuration.

As another example, direction drive configurations, such as forward and reverse drive configurations, may be selected by a user input device in the form of a direction switch 112, which enables a user to select the relative direction (i.e., clockwise or counterclockwise) of rotation of output(s) 50 and thereby configure the vehicle to drive in forward and reverse directions upon energization of the motor assembly. Actuator 104, and switches 108, 110, and 112 (when present) may be located in any suitable location on body 12 and/or steering assembly 26. Preferably, the switches or other user input devices are positioned for actuation by a child sitting on seat 18. Illustrative (non-exclusive) examples of suitable positions are shown in FIG. 2.

A further example of drive configurations may be referred to as power configurations and relate to whether or not the drive assembly's motor assembly is in an energized state, in which the motor assembly is driving the rotation of the driven wheel assembly, or a de-energized state, in which the motor assembly is not driving the rotation of the driven wheel assembly. In other words, when in the de-energized drive configuration, the motor assembly does not drive the rotation of the ride-on vehicle's driven wheel assembly. As an illustrative example, the drive assembly may be selectively configured from a de-energized drive configuration to an energized drive configuration responsive to a user, such as a child sitting on a seat of the ride-on vehicle, actuating drive actuator 104. As discussed, this may (but is not required in all embodiments to) include pressing or otherwise manipulating a throttle lever or button, or depressing a foot pedal.

The drive assembly may include any suitable structure to selectively enable the plurality of drive configurations. For example, switching between forward and reverse drive configurations may be implemented by reversing the polarity of the battery assembly relative to the motor assembly. As another example, relative speed configurations may be achieved by switching two or more batteries and/or two or more motors between series and parallel configurations. As a further example, gears or similar mechanical structures may be utilized to configure relative speed configurations. As yet another example, a microprocessor or other controller may enable the configurations via predetermined programming. Continuing this example, relative speed configurations may be achieved through pulse-width modulation or other duty cycle ramping of the energization of the motor assembly.

It is within the scope of the present disclosure that the plurality of drive configurations may include other configurations than the illustrative examples described herein. Similarly, the drive assembly may be configured, such as responsive to user inputs to the user input devices, to a drive configuration that includes more than one of the illustrative configurations described above. For example, a vehicle may be configured to such configurations as a low-speed forward configuration, a high-speed forward configuration, a low-speed reverse configuration, a high-speed reverse configuration, a medium-speed forward configuration, a medium-speed reverse configuration, etc.

The implementation of one or more selected drive configurations may occur prior to, simultaneous with, or after receipt of the configuration input(s). For example, a child may, via one or more configuration inputs, select a particular speed and/or direction drive configuration and thereafter, via an actuation input, drive the vehicle according to the selected drive configuration(s). As another example, a child may be driving the vehicle according to a particular drive configuration(s) and thereafter, via one or more configuration inputs, select a different drive configuration(s), such as a different direction or speed configuration. As yet another example, a user input device may provide both actuation and configuration inputs so that actuating the user input device both selects and implements one or more drive configurations.

As shown in FIG. 3, drive assembly 30 may (but is not required to) further include a controller 114, which controls the operation of the drive assembly responsive to at least one of received user inputs and predetermined programming. As an illustrative example, controller 114 may be adapted to control electronically the transmission of a user-selected speed to the driven wheel assembly and/or to configure the drive assembly to the user-selected drive configuration. Controller 114 may include a microprocessor or suitable control circuit. In the context of configuring the drive assembly to a selected drive configuration, the controller may be adapted to selectively enable or disable selected ones of the plurality of drive configurations responsive to user inputs, such as via user input devices 102, predetermined programming, and/or inputs from other sensors or switches.

When controller 114 is adapted to regulate the energization of the motor assembly, it may regulate electronically the rotational input transmitted by the motor assembly to the driven wheel assembly. For example, controller 114 may regulate at least one of the timing and the ramp, or rate, of application of the transmission of the rotational input after actuation of a corresponding user input device by a child sitting on seat 18. In other words, the controller may be configured to delay in at least time and/or rate of transmission the rotational input to the driven wheel assembly responsive at least in part to a user input selecting the desired, or selected, rotational input. An illustrative example of a suitable controller is disclosed in U.S. Pat. No. 6,771,034, the complete disclosure of which is hereby incorporated by reference for all purposes.

It is also within the scope of the present disclosure that controller 114 may selectively control the transmission of the selected rotational input (such as determined by the selected speed configuration and/or actuation input). By this it is meant that the controller may be configured to control the transmission of the selected rotational input in certain situations, such as when certain parameters or thresholds are satisfied. For example, controller 114 may regulate the transmission of rotational input only when the selected rotational input occurs when the ride-on vehicle is already being driven (such as during a user-selected change in speed or direction), when the ride-on vehicle is already traveling at more than a predetermined speed (actual or selected), or when the ride-on vehicle changes direction.

As shown in FIG. 2, body 12 also includes a battery compartment 120 that is adapted to receive battery assembly 60. The battery compartment may take any of a variety of different shapes, sizes, and configurations depending on such factors as the form of vehicle 10, the portion of the vehicle's body within which the compartment is formed, and the size and shape of battery assembly 60. FIG. 2 provides graphical illustrations of several suitable positions for battery compartment 120.

As indicated in FIG. 3 at 140, the drive assembly further includes, and/or otherwise communicates with, a detection system that is adapted to detect whether one or more wheels of sensed wheel assembly 31 contacts the ground surface and/or when the one or more wheels lose contact with the ground surface. As such, detection system 140 may be referred to as a ground detection system. Upon detection of loss of contact of the one or more sensed wheels with the ground surface upon which the ride-on vehicle is driven and/or positioned, the ground detection system is adapted to automatically restrict, or disable, at least one of the plurality of drive configurations in which the drive assembly may be configured, at least until the one or more sensed wheels return into contact with the ground surface. In other words, when the ground detection system detects (directly or indirectly) that the one or more sensed wheels are in contact with the ground surface, a plurality of drive configurations, such as those discussed above, are available and may be selected (such as via user inputs to the user input devices) and may be realized or implemented (such as via inputs to drive actuator(s)). However, when the ground detection system detects that one or more sensed wheels lose, or otherwise are not in, contact with the ground surface, the ground detection system restricts the plurality of drive configurations so that only a subset (i.e., less than all) of the plurality of drive configurations is available. By this it is meant that the drive assembly is restricted, or prevented, from implementing one or more of the plurality of drive configurations when the ground detection system detects that at least one of the sensed wheels is not in contact with the ground surface. Upon detection by the ground detection system that the one or more sensed wheel is again in contact with the ground surface, the ground detection system may no longer restrict the plurality of drive configurations and therefore enable the drive assembly to be selectively configured between any of the plurality of drive configurations.

As an illustrative, non-exclusive example, the ground detection system may be adapted to restrict the drive assembly from being in an energized drive configuration (such as by preventing the battery assembly from energizing the motor assembly and/or preventing the corresponding user input from directing the battery assembly to energize the motor assembly) when the ground detection system detects that one or more sensed wheels are not in contact with the ground surface. Expressed in slightly different terms, when the ground detection system detects that one or more sensed wheels lose or otherwise are not in contact with a ground surface, the ground detection system may restrict or otherwise prevent the drive assembly from being in an energized drive configuration, regardless of (or independent of) the user inputs received to the drive assembly. In such an embodiment, the drive assembly would be in a de-energized drive configuration regardless of whether or not a child had selected an energized drive configuration with the appropriate user inputs. However, upon detection that the one or more sensed wheels returned into contact with the ground surface, the ground detection system may again enable or permit an energized drive configuration of the drive assembly to be selected by a user and implemented, or realized, by the drive assembly.

The restriction of the plurality of drive configurations to a subset of the plurality of drive configurations may be accomplished through any suitable electrical and/or mechanical mechanisms. As discussed, this restriction may occur regardless of user inputs that otherwise would select and implement the selected drive configuration if the one or more sensed wheels were in contact with the ground surface. Furthermore, the restriction of one or more of the plurality of available drive configurations and the return to this plurality of available drive configurations may occur automatically responsive to the one or more wheels contacting and losing contact with the ground surface.

As another illustrative, non-exclusive example, the ground detection system may be configured to prevent a ride-on vehicle which otherwise may be driven in an energized drive configuration from being driven in the energized drive configuration when at least a first sensed wheel and a second sensed wheel of the sensed wheel assembly lose contact with the ground surface. Upon detection of loss of contact of both of the first and second sensed wheels, such as by ground detection system 140, the drive assembly is prevented (such as via controller 114, via a suitable switch, or otherwise) from being configured to an energized drive configuration. A child may still manipulate or otherwise depress one or more user input devices to select one or more energized drive configurations. However, the drive assembly is not reconfigured responsive to the child's actuation of the input device. For example, a controller may be programmed to not respond to the user input from the speed switch and the power switch, the drive assembly may be toggled to disengage the speed switch or the power switch when both the first and second sensed wheels lose contact with the ground surface, a switch may be toggled (and/or a circuit selectively opened or closed) when both of the first and second sensed wheels lose contact with the ground surface, etc. The ground detection system may be configured to permit the drive assembly to again be configured to an energized drive configuration when at least one of the first and the second sensed wheels again contact the ground surface. It is also within the scope of the present disclosure that the ground detection system does not enable energized operation of the drive assembly to resume until at least both of the first and the second sensed wheels again contact the ground surface.

Although the above illustrative example discusses that the drive assembly is prevented from being configured to an energized drive configuration when the ground detection system detects that both of the first sensed wheel and the second sensed wheel lose contact with the ground surface, it is within the scope of the disclosure that the drive assembly may be prevented from being configured to an energized drive configuration when at least one sensed wheel (such as either the first sensed wheel or the second sensed wheel) of the sensed wheel assembly loses contact with the ground surface. Additionally, although the above illustrative example discussed that the drive assembly may be configured to an energized drive configuration when at least one of the first sensed wheel and the second sensed wheel contact the ground surface, it is within the scope of the disclosure that the drive assembly may be configured to an energized drive configuration only when both of the first and the second sensed wheels of the sensed wheel assembly contact the ground surface. For example, the drive assembly may be configured to an energized drive configuration only when at least a substantial number or all of the wheels of the sensed wheel assembly contact the ground surface.

As another illustrative example, when one or more wheels of the sensed wheel assembly loses contact with the ground surface, detection system 140 may be utilized to prevent the drive assembly of the ride-on vehicle from being configured to a high-speed drive configuration and/or to a drive configuration in which the selected or actual speed exceeds a predetermined threshold. The examples of restricting energized and/or high-speed drive configurations responsive to a detection system 140 detecting loss of contact of the one or more wheels with the ground surface are intended to be additional non-exclusive illustrative examples.

It is within the scope of the present disclosure that a vehicle's drive assembly may be configured to selectively restrict any of its plurality of drive configurations responsive to the detection by the ground detection system of loss of contact of the one or more sensed wheels with the ground surface. As such, the type and number of drive configurations available to a particular ride-on vehicle may vary within the scope of the present disclosure, such as depending upon the particular construction and components of that vehicle. The detection system and cooperating components of drive assembly 30 may be referred to herein as a means for restricting the plurality of drive configurations of the drive assembly. In the context of a drive assembly in which an energized drive configuration is restricted, the drive assembly may be described as including means for restricting an energized drive configuration of the drive assembly. In the context of a drive assembly in which a high-speed drive configuration is restricted, the drive assembly may be described as including means for restricting a high-speed operation or a high-speed drive configuration.

It is also within the scope of the present disclosure that the selective restriction of the plurality of drive configurations may be coupled with an automatic selection of another of the plurality of drive configurations and/or a maintaining of the drive configuration that was selected before the restricted drive configuration was selected. As an illustrative, non-exclusive example, when a restricted drive configuration is selected while a vehicle's drive assembly is not being used to drive the rotation of the vehicle's driven wheel assembly, the drive assembly may be configured to simply remain in this at rest, or non-driven, drive configuration until a user selects a drive configuration that is not restricted. As another illustrative example, the drive assembly may be configured to respond to the selection of a restricted drive configuration by instead configuring one of the drive configurations that is not restricted. For example, if the above-discussed restricted high-speed drive configuration is selected while the vehicle assembly is being driven in a forward drive configuration, the drive assembly may be adapted to automatically transition to a de-energized (or unpowered or off) drive configuration in which the motor assembly is not energized by the battery assembly.

As another illustrative, non-exclusive example, if the restricted high-speed drive configuration is selected by a user, the drive assembly may instead maintain or configure a medium- (if not restricted) or low-speed drive configuration. As another example, it may instead select a de-energized (or off) drive configuration, in which the vehicle's motor assembly will not be energized until a non-restricted drive configuration is selected and/or the detection system no longer restricts the drive configuration, such as when the detection system no longer detects loss of contact of the one or more wheels with the ground surface. In such an embodiment, the drive assembly may either coast or brake, depending, for example, upon its construction.

Detection system 140 may utilize any suitable structure for detecting when one or more wheels of sensed wheel assembly 31 loses contact with a ground surface. For example, the detection system may include one or more ground detection assemblies 142, as schematically indicated in FIG. 3. At least one of the ground detection assemblies is operatively connected to a respective sensed wheel 33 of the sensed wheel assembly 31 to detect when the respective wheel loses contact with the ground surface. "Operatively connected," as used herein, means connected, directly and/or indirectly, via mechanical, electrical, electromagnetic, fluid, and/or other connection(s) to allow detection of loss of contact of the respective wheel with the ground surface. "Respective wheel," as used herein, means the wheel of the sensed wheel assembly that the particular ground detection assembly is operatively connected to such that, for example, the particular ground detection assembly may detect when the wheel has lost contact with the ground surface. In FIG. 3, dashed lines are used to indicate graphically that the sensed wheel assembly may (but is not required to) include at least one wheel that is also a driven wheel.

Figure 5:
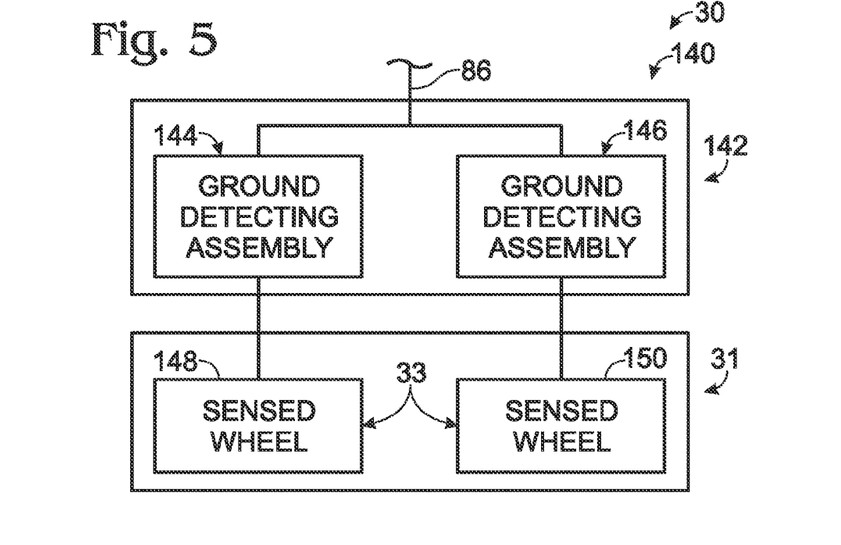
FIG. 5 is a schematic diagram of a ground detection system in communication with a sensed wheel assembly of a children's ride-on vehicle according to the present disclosure.

In FIG. 5, an illustrative, non-exclusive example of a suitable ground detection system 140 according to the present disclosure is schematically illustrated. As shown, detection system 140 includes a pair of ground detection assemblies 142, which are separately indicated at 144 and 146. The ground detection assemblies are respectively coupled to a pair of sensed wheels 33, which are separately indicated at 148 and 150. Ground detection assembly 144 is operatively connected to a sensed wheel 148, while ground detection assembly 146 is operatively connected to a sensed wheel 150. The illustrative example shown in FIG. 5 includes a sensed wheel assembly with sensed wheels 148 and 150. This pair of sensed wheels may correspond to the first and second sensed wheels discussed in the illustrative examples presented herein. As discussed, these wheels may, but are not required to, additionally be driven and/or steerable wheels. It is within the scope of the present disclosure that the ground detection system may include a single sensed wheel, or more than two sensed wheels. In some embodiments, all of the wheels of the plurality of wheels may be sensed wheels, but this is not required in all embodiments.

Although the illustrative, non-exclusive example of a detection system 140 in FIG. 5 is shown to include two ground detection assemblies, the scope of the disclosure includes detection systems having more or less ground detection assemblies, including a detection system with a single ground detection assembly and a detection system with three or more ground detection assemblies. It is within the scope of the present disclosure that each ground detection assembly may be in communication with, or operatively coupled to, a single sensed wheel. When the detection system includes two or more ground detection assemblies, each detection assembly may be associated with, or in communication with, a different sensed wheel. It is also within the scope of the present disclosure that a ground detection assembly may be in communication with, or associated with, two or more sensed wheels.

Figure 6:
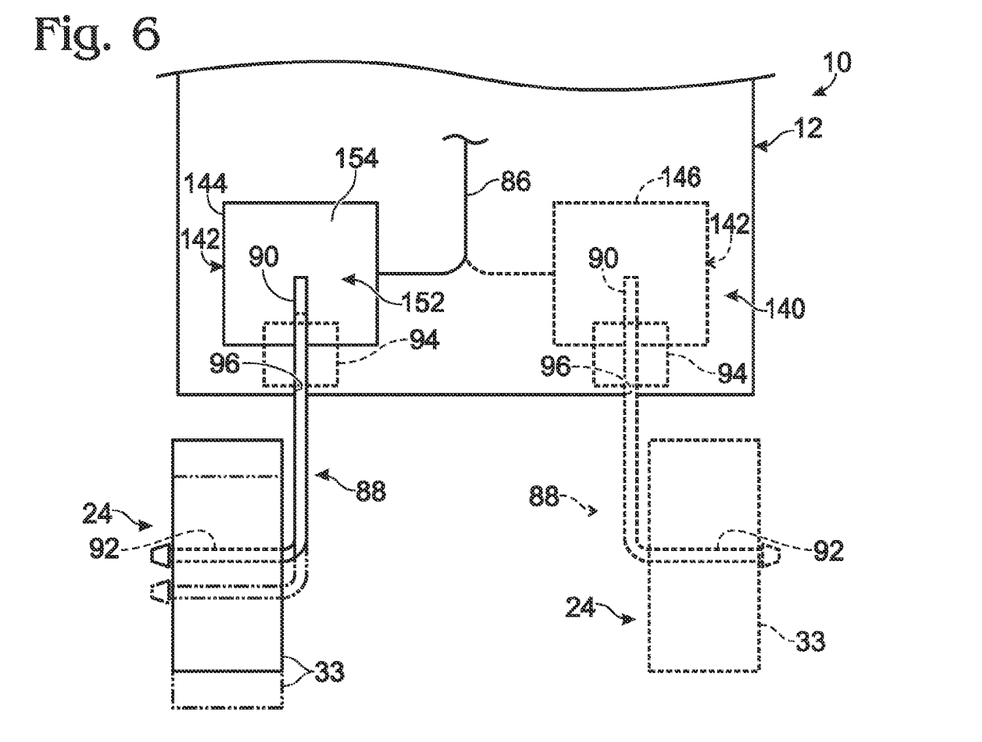
FIG. 6 is a schematic diagram showing a children's ride-on vehicle with a ground detection system with a sensed wheel assembly according to the present disclosure.

In FIG. 6, another illustrative example of a ground detection system 140 that includes at least one ground detection assembly 142 that is associated with at least one sensed wheel 33 is shown. In the illustrated example, a sensed wheel 33 is schematically illustrated in solid lines as being rotatably mounted on a spindle, or axle, 88. The spindle includes first and second end portions 90 and 92, with the wheel being rotatably mounted on second end portion 92 and a ground detection assembly being operatively coupled to first end portion 90. The shape of the illustrated spindle is meant for purposes of illustration, and not limitation, and the shape of the spindle or axle upon which a sensed or other wheel of the plurality of wheels is mounted may vary without departing from the scope of the present disclosure. It is also within the scope of the present disclosure that two or more sensed wheels are mounted on the same spindle or axle.

At least first end portion 90 of the spindle is illustrated extending to body 12 of a ride-on vehicle 10, such as by extending into one or more channels, or sockets, 96. Spindle 88 is slidably coupled to the body and may translate, or otherwise move, within a range of positions relative to the body, such as between retracted and extended positions, with the spindle (and corresponding wheel 33) being spaced further from the body in the extended position than in the retracted position. As a somewhat schematic graphical example, a suitable retracted position is shown in solid lines in FIG. 6, with a corresponding extended position shown in dash-dot lines. The retracted position may additionally or alternatively be referred to as a ground-contacting position, as it corresponds to the position of the spindle (and associated wheel) when the wheel is in contact with a ground surface upon which the ride-on is driven or otherwise supported. The extended position may additionally or alternatively be referred to as an elevated position or a lifted position, as it corresponds to the position of the spindle (and associated wheel) when the wheel loses contact with or is otherwise elevated above the ground surface, such as if a portion of the ride-on's body proximate spindle 88 is elevated or inclined relative to the ground-contacting position.

Spindle 88 may be configured to move to the extended position when, for example, wheel 33 loses contact with a ground surface and the weight of spindle 88 and/or wheel 33 urges the spindle toward the extended position. The ground detection system may optionally include at least one bias assembly 94 that is adapted to urge spindle 88 (and wheel 33) generally away from the body, such as toward the extended position. When present, any suitable structure may be used for the bias assembly, such as springs, resilient members, and the like. As discussed, FIG. 6 is a schematic diagram, and the illustrated distance between the wheel and the body for the retracted and extended positions are merely illustrative, non-exclusive examples. The scope of the present disclosure includes any suitable spacing between the wheel and the body for the retracted and extended positions.

In FIG. 6, ground detection assembly 142 is illustrated as being operatively connected, or operatively coupled, to spindle 88, such as being associated with first end portion 90. Ground detection assembly 142 detects whether or not sensed wheel 33 is in a ground-contacting or elevated position by monitoring or detecting the relative position of first end portion 90 of the spindle. This detection may be accomplished, or enabled, via any suitable technique or mechanism. As illustrative, non-exclusive examples, the assembly may include a sensor assembly 152 with one or more sensors 154 that detect the relative position of the first end portion of the spindle. The sensors may, but are not required to, include or be switches that are opened or closed responsive to the relative movement of the spindle between the retracted and extended positions. When implemented as switches, any suitable construction and type of switch may be utilized. This relative opening and/or closing of the switch thereby indicates that at least sensed wheel 33 is in a ground-contacting or elevated position. Ground detection system 140 may selectively restrict or enable the plurality of drive configurations of the ride-on vehicle's drive assembly responsive to this input from ground detection assembly 142.

As discussed, it is within the scope of the present disclosure that the ground detection system may include more than one ground detection assembly 142 and more than one sensed wheel 33. This is schematically illustrated in FIG. 6, in which a second ground detection assembly 142 and a second sensed wheel 33 are shown in dashed lines, with the pair of ground detection assemblies 142 being respectively indicated at 144 and 146. When a ground detection system 140 according to the present disclosure includes two or more ground detection assemblies 142, the ground detection system may be adapted to restrict the plurality of drive configurations of the ride-on vehicle's drive assembly responsive to any of the ground detection assemblies detecting that a corresponding sensed wheel is in an extended, or elevated position. It is also within the scope of the present disclosure that the ground detection system may be configured to only restrict the plurality of drive configurations when two or more sensed wheels are detected to be in the extended, or elevated, position, such as responsive to detection thereof by a corresponding pair of ground detection assemblies.

When two or more sensed wheels are mounted on a common spindle, or axle, the ground detection system may (but is not required to) include a single ground detection assembly that is adapted to detect relative translational movement of the spindle, or axle, such as between the previously described extended and retracted positions. In such a configuration, the two or more sensed wheels that are mounted on the spindle or axle may be configured for relative translational movement as a unit with the spindle or axle, and therefore a separate detection assembly that is associated with each wheel may not be needed.

Figure 7:
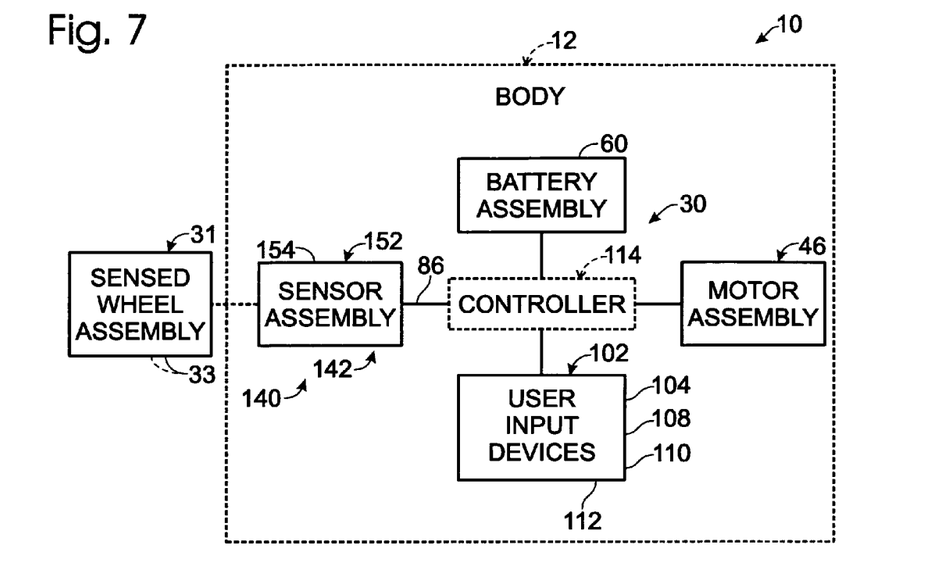
FIG. 7 is a schematic diagram showing another children's ride-on vehicle with a ground detection system according to the present disclosure.

As indicated in FIG. 7, ground detection system 140 may include a ground detection assembly 142 that includes a sensor assembly 152 having one or more sensors 154 that are adapted to detect whether or not one or more wheels of the sensed wheel assembly have lost contact with the ground surface. For example, the one or more sensors may be actuated upon loss of contact of the one or more wheels with the ground surface. Sensor assembly 152 may include any suitable number and type of structure for detecting or otherwise determining whether or not the one or more wheels have lost contact with the ground surface. Illustrative, non-exclusive examples include one or more of an electrical sensor, an optical sensor, a mechanical sensor, conductive contacts, a magnetic sensor, or other suitable sensing or measuring device. FIG. 7 also graphically depicts that detection system 140, such as via sensor assembly 152, selectively communicates with one or more wheels of sensed wheel assembly 31 (and/or body 12) and the rest of drive assembly 30, which in turn selectively permits or restricts one or more of the plurality of drive configurations responsive to inputs or other signals from the detection system. When drive assembly 30 includes a controller, the sensor assembly may (but is not required to) communicate with the controller. In view of the above, the detection system may be described as including means for detecting when the one or more wheels lose contact with the ground surface.

It is also within the scope of the present disclosure that a ground detection system 140 may be configured to additionally or alternatively include at least one ground detection assembly 142 that is operatively connected to body 12 of the ride-on vehicle. For example, one or more of the ground detection assemblies may be adapted to detect when one or more wheels lose contact with the ground surface based on the body's position relative to the ground surface and/or any suitable predetermined standard, such as by detecting inclination or tilting of one or more portions of the body, detecting relative movement or spacing between two or more portions of the body, etc.

Figure 8:
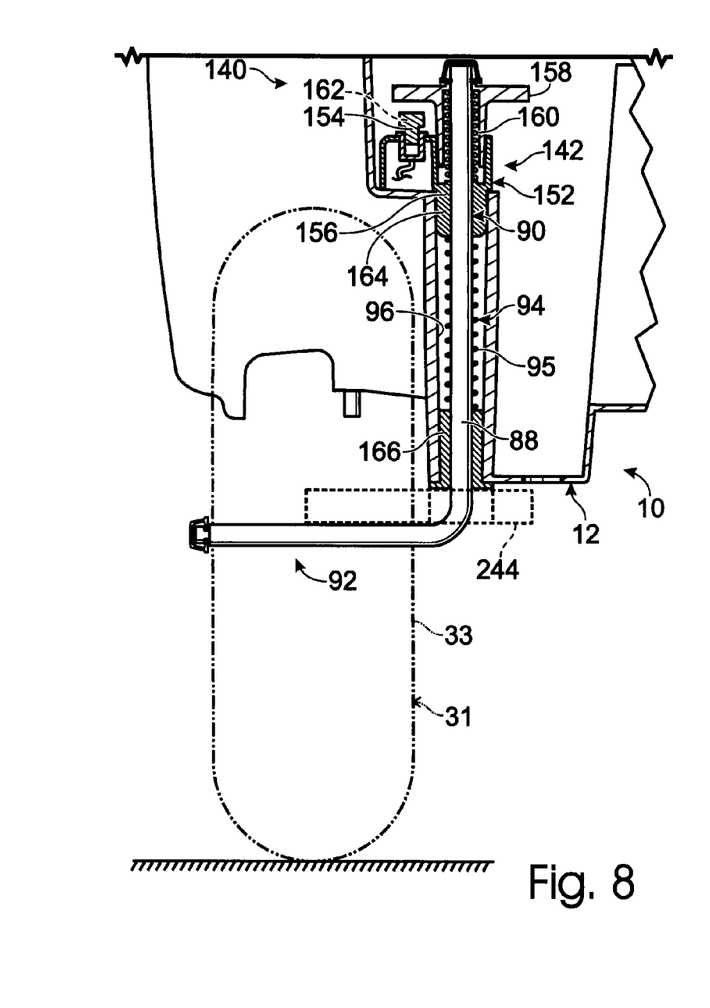
FIG. 8 is a fragmentary cross-sectional view of a children's ride-on vehicle with a ground detection system according to the present disclosure, with the illustrated example showing a spindle in a retracted position, an actuator of the ground detection system in a disengaged position, and a switch of the ground detection system in an unactuated position.
Figure 9:
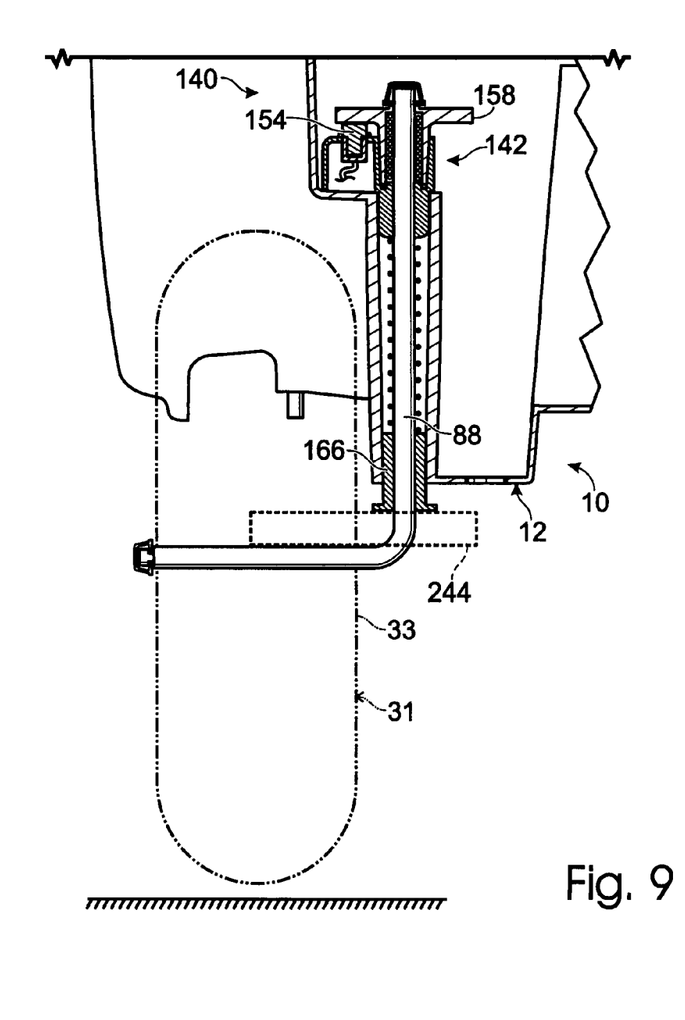
FIG. 9 is a fragmentary, cross-sectional view of the vehicle and the ground detection system of FIG. 8 showing the spindle in an extended position, the actuator of the ground detection system in an engaged position, and the switch of the ground detection system in an actuated position.

FIGS. 8 and 9 provide a less schematic illustrative, non-exclusive example of a ground detection system 140 according to the present disclosure associated with a spindle, or axle, 88 upon which a sensed wheel 33 of sensed wheel assembly 31 is rotatably mounted. As illustrated in FIGS. 8 and 9, and as indicated with reference numerals in FIG. 8, a sensed wheel 33 is rotatably mounted on a second end portion 92 of the spindle, with at least a first end portion 90 of the spindle being received into, or extending into, a channel, or socket, 96 in the body 12 of the ride-on vehicle. Also shown in FIG. 8 is an optional bushing 166 that is sized to receive a portion of spindle 88 therethrough to assist in positioning the spindle (and corresponding sensed wheel 33) relative to the body of the ride-on vehicle. It is within the scope of the present disclosure that bushing 166, when present, may be coupled to the spindle to move with the spindle, secured to the spindle, secured to the body of the ride-on, integrally formed with the body of the ride-on, etc. In some embodiments, such as illustrated in FIG. 9, the bushing may be configured to be removably and slidably received within channel 96, such as to permit the bushing to be urged at least partially out, or away from, the channel when the spindle is in its extended, or elevated, position. Also shown in FIGS. 8 and 9 is an optional biasing assembly 94 that is illustrated in the exemplary form of a coil spring 95 and which is adapted to urge the bushing and spindle 88 generally away from the body of the ride-on or otherwise toward an extended position, such as shown in FIG. 9. Any suitable structure may be used for the bias assemblies, such as springs, resilient members, and the like, with the illustrated coil spring providing an illustrative, non-exclusive example.

The ground detection system 140 shown in FIGS. 8 and 9 includes a ground detection assembly 142 with a sensor assembly 152. The sensor assembly includes a switch 154, and an actuator 158 that is coupled for movement relative to the switch responsive to movement of the spindle and sensed wheel between the ground-contacting and elevated positions. As illustrated, switch 154 is adapted to be configured from its unactuated position (shown in FIG. 8), to its actuated position (shown in FIG. 9) when the respective wheel loses contact with the ground surface (i.e., is in its elevated, or extended, position). When configured from its first position to its second position, switch 154 may selectively open or close a circuit or otherwise send a signal to the controller or other portion of the drive assembly, thereby communicating the loss of contact of the respective sensed wheel with the ground surface and selectively resulting in the corresponding restriction of the driving configurations available to the drive assembly of the vehicle. When sensor assembly 152 includes a switch 154, the switch and/or actuator may optionally include a suitable biasing mechanism 162 that biases the switch to its unactuated, or open, position. Any suitable structure may be used for biasing mechanisms, such as springs, resilient members, and the like. Therefore, when the respective wheel contacts the ground surface, the switch automatically returns to its first, unactuated position.

In FIGS. 8 and 9, ground detection assembly 142 includes a base member 156 that provides a mount for switch 154 and which provides a bushing 164 through which first end portion 90 of the spindle extends to position and/or support the spindle for at least sliding movement relative to the ride-on's body. As shown, bushing 164 extends into channel 96 of the body and slidingly receives spindle 88, thereby allowing the spindle to move between the retracted position and the extended position. Base member 156 also slidingly receives actuator 158, such that the actuator is adapted to move between a disengaged position in which the actuator is spaced from the switch (shown in FIG. 8), thereby leaving the switch unactuated, and an engaged position in which the actuator contacts the switch (shown in FIG. 9), thereby actuating the switch. Actuator 158 is connected to the first end portion 90 of the spindle such that the actuator moves when the spindle moves. Thus, spindle 88 may be described as being operatively connected to switch 154 (via actuator 158) such that switch 154 is in the first position when the spindle is in the retracted position, and the switch is in the second position when the spindle is in the extended position.

The sensor assembly may optionally include a bias assembly 160, which is adapted to urge the actuator toward the disengaged position or otherwise urge the actuator away from the switch. Any suitable structure may be used for the bias assembly, such as springs, resilient members, and the like. The bias assembly may additionally, or alternatively, be adapted to dampen movement of the actuator and/or spindle such that the actuator does not move to the engaged position when the respective wheel momentarily loses contact with the ground surface during operation of the vehicle.

In operation, when sensed wheel 33 is elevated above, or otherwise loses contact with, a ground surface, the wheel translates from the retracted, or ground-contacting, position shown in FIG. 8 to an extended, or elevated, position, such as shown in FIG. 9. This movement of the sensed wheel (and spindle 88 and actuator 158) may be caused by the weight of the wheel and spindle 88. As discussed, ground detecting assembly 142 may optionally include a biasing assembly 94 that assists in urging the sensed wheel toward its extended position. This relative movement of the sensed wheel relative to the body of the ride-on draws the actuator into engagement with switch 154 to configure the switch from an open configuration to a closed configuration, thereby creating an electrical signal, or lack thereof, that the sensed wheel is in an extended configuration. As discussed, ground detection system 140 may restrict the plurality of drive configurations of the ride-on vehicle's drive assembly responsive to a single ground detection assembly detecting that a sensed wheel is in an extended position, responsive to at least a pair of ground detection assemblies detecting that a pair of sensed wheels are in an extended position, etc. As the sensed wheel is returned from its extended position to its retracted, or ground-contacting position, this results in a corresponding movement of spindle 88 and actuator 158. Disengagement of switch 154 by actuator 158 configures the switch back to its open configuration.

In the above-described illustrative example, switch 154 is in an open configuration when the corresponding sensed wheel is in a ground-contacting position, and in a closed configuration when the corresponding sensed wheel is in an extended, or elevated, position. This configuration is not required in all embodiments of ground detection assemblies that include a switch 154. As an illustrative example, in some embodiments, switch 154 may be configured to be in a closed configuration when the sensed wheel is in its ground-contacting configuration, with the switch being adapted to be configured to an open configuration when the sensed wheel is moved to its extended, or elevated, position. As a further variant, switch 154 may optionally be mounted on actuator 158, with the switch being moved into and out of contact with a corresponding portion of the vehicle's body responsive to translational movement of the spindle (and corresponding sensed wheel 33) between the retracted and extended positions. It should be understood that switch 154 is operatively connected to the drive assembly of the vehicle, such as via the drive-assembly's wiring harness 86, which is also schematically illustrated in the previously described FIGS. 5-7.

In FIGS. 8 and 9, busing 166 is shown in solid lines extending generally between body 12 of the ride-on vehicle and spindle 88. As discussed, it is within the scope of the present disclosure that a sensed wheel 33 may also be a steerable wheel. In such an embodiment, the spindle upon which the sensed (and steerable) wheel 33 is rotatably mounted may also be operatively connected to the steering column of the ride-on vehicle's steering assembly. Accordingly, steering inputs received by the steering assembly's steering mechanism (such as from a child sitting on the ride-on's seat) may be conveyed to the spindle and steerable wheel to steer the path of travel defined by the wheel. As an illustrative, non-exclusive example of a suitable construction, the steering assembly may include a steering lever that is coupled to the spindle, such as indicated in dashed lines at 244 in FIGS. 8 and 9. When present, a steering lever may be positioned beneath bushing 166 (when present), secured to bushing 166, and/or integrally formed with bushing 166. When optional steering lever 244 is not present, bushing 166 may (but is not required to), abut against second end region 92 or another suitable portion of spindle 88 so that urging of the bushing away from the body of the ride-on (in embodiments where the bushing is slidable relative to body 12) also urges the spindle toward its extended position. This is schematically illustrated in dash-dot lines in FIG. 8.

Figure 10:
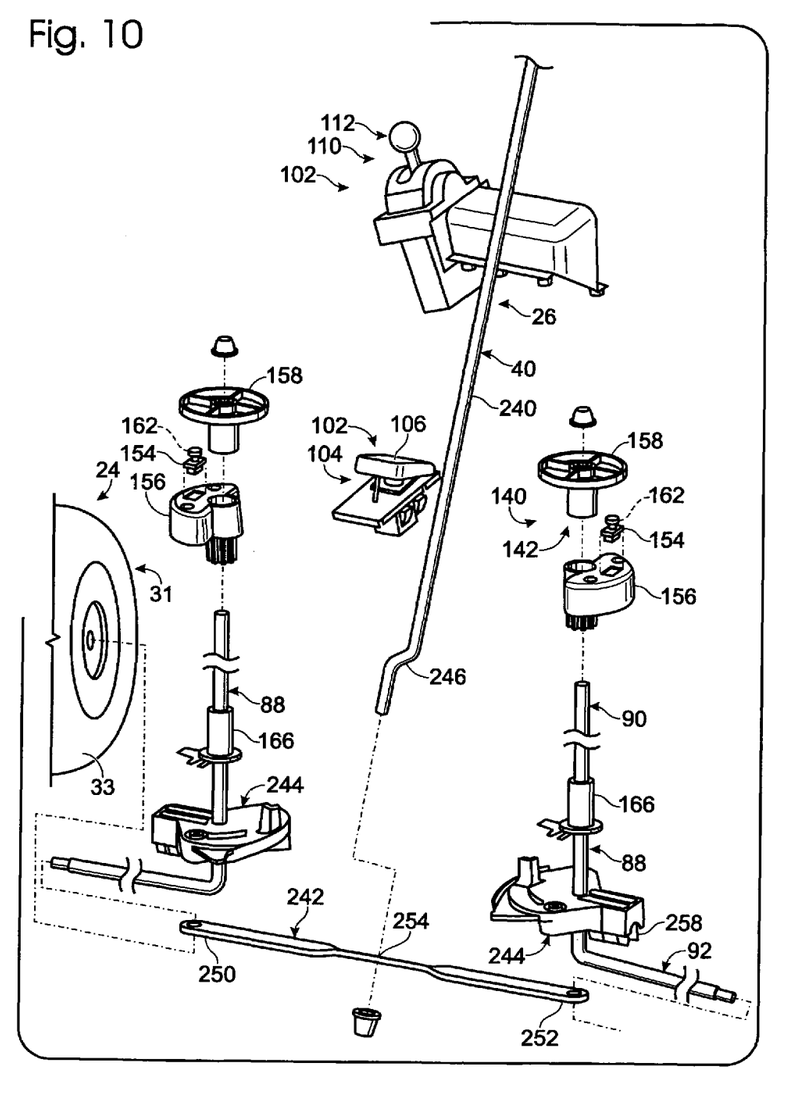
FIG. 10 is an exploded isometric view of another illustrative, non-exclusive example of a ground detection system according to the present disclosure, with the illustrated ground detection system shown with portions of a ride-on vehicle's drive assembly and steering assembly.
Figure 11:
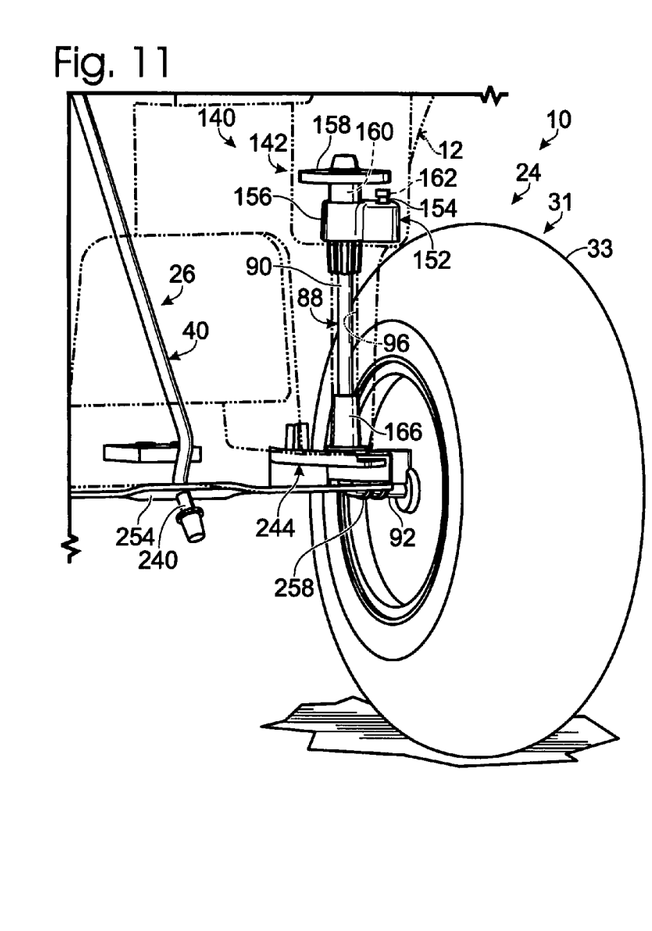
FIG. 11 is a fragmentary isometric view of the ground detection system and steering assembly of FIG. 10, with the spindle of the steering assembly shown in a retracted position, an actuator of the ground detection system shown in a disengaged position, and a switch of the ground detection system shown in an unactuated position.
Figure 12:
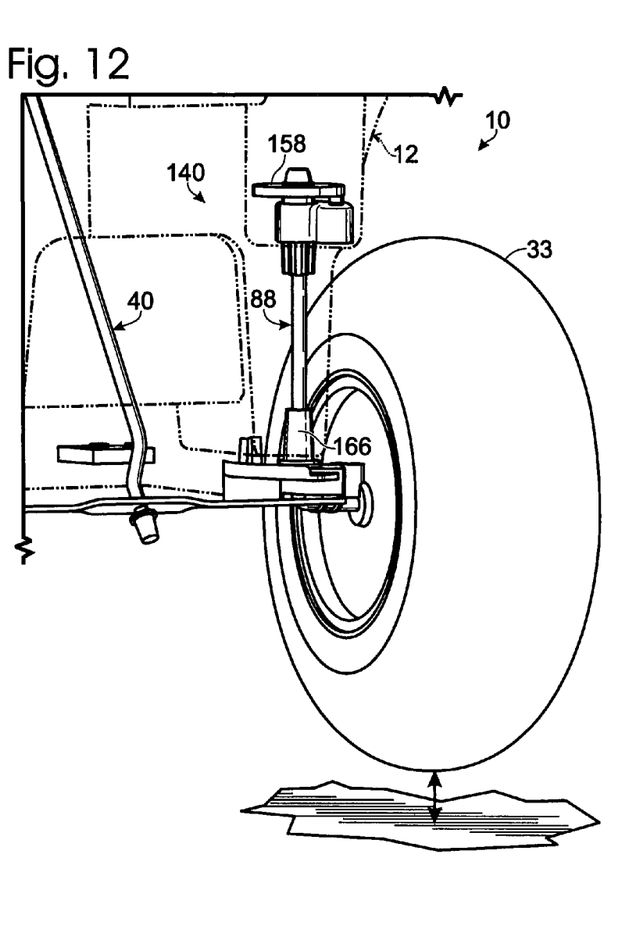
FIG. 12 is a fragmentary isometric view of the ground detection system and steering assembly of FIG. 10, with the spindle of the steering assembly shown in an extended position, the actuator of the ground detection system shown in an engaged position, and the switch of the ground detection system shown in an actuated position.

FIGS. 10-12 provide illustrative, non-exclusive examples of a ground detection system 140 that is adapted to detect the relative (i.e., ground-contacting or elevated) position of a sensed wheel 33 that is also a steerable wheel that forms a portion of the ride-on vehicle's steering assembly 26. For the purposes of brevity, the ground detection assembly 142 will be illustrated with the non-exclusive example of components that were previously illustrated and described with respect to FIGS. 8 and 9. Each of these elements, including optional variants thereof, will not be described again with respect to FIGS. 10-12. It is within the scope of the present disclosure that any of the other constructions, elements, subelements, and variants described and/or illustrated herein may be utilized.

In FIG. 10, ground detection system 140 is shown including a pair of ground detection assemblies 142 that are operatively connected to spindles 88 associated with sensed (and steerable) wheels 33. Each spindle 88 is also operatively connected to a steering lever 244 so that relative rotation of the steering lever results in pivoting, or rotation, of the second end portion 92 of the spindle about a steering axis defined by first end portion 90. In the illustrated example, the steering lever includes a mount, or coupling, 258 into which the second end portion of the spindle is received. In FIG. 10, optional bushings 166 are shown and illustrated as separate elements from steering lever 244. As discussed, it is within the scope of the present disclosure that bushings 166, when present, are secured to, or even integrally formed with, steering levers 244. Also shown in FIG. 10 is a steering linkage 242 that interconnects the steering levers with the steering assembly's steering column 40 so that rotation of the steering column results in reciprocal movement of the steering levers to pivot the spindles (and corresponding wheels) about their respective pivot axes. In the illustrated, non-exclusive example, the steering linkage includes end regions 250 and 252 that are coupled to the steering levers, and a central region 254 that is suitably coupled to a distal end region 246 of the steering column. As illustrated, the steering column 40 includes an elongate shaft 240 that is connected at a first end region, or proximal portion, to a steering mechanism (not shown) to receive steering inputs from a child sitting on a seat of the ride-on vehicle. The distal end region, or second end region, 246 of the steering column in the illustrated example includes an offset shoulder portion that pivots about a steering axis defined by shaft 240. Other constructions may be utilized for steering column 40, steering linkage 242, and steering levers 244 without departing from the scope of the present disclosure.

Also illustrated in FIG. 10 are less schematic illustrative, non-exclusive examples of suitable user input devices 102, such as a drive actuator 104 in the form of a foot pedal, or foot switch, 106 that is selectively depressed by a child to select an energized drive assembly for the ride-on vehicle's drive assembly. Also shown is an example of a user input device 102 in the form of a shifter assembly that includes at least one speed switch 110 and a direction switch 112 for a child to selectively select between forward and reverse drive configurations and between two or more speed configurations. As discussed, the respective electrical components of the ride-on vehicle's drive assembly may be connected via any suitable structure, including a wiring harness.

In FIGS. 11 and 12, a portion of the ground detection system and steering assembly of FIG. 10 is shown assembled with the body of a children's ride-on vehicle. In FIG. 11, wheel 33 is shown in its retracted, or ground-contacting position, while in FIG. 12, wheel 33 is shown in its extended, or elevated, position. Illustrative, non-exclusive examples of the relative movement of the other components of the steering assembly and ground detection system between the retracted and extended positions are also shown in FIGS. 11 and 12. In FIGS. 11 and 12, the optional coil spring 95 or other biasing assembly 94 has not been illustrated so as not to obscure the other details shown in FIGS. 11 and 12. It is within the scope of the present disclosure that the illustrative example of a ground sensing system 140 shown in FIGS. 11 and 12 may include such a spring or other suitable biasing assembly. However, it is also within the scope of the present disclosure for the ground sensing system to be formed without such a biasing assembly.

While illustrative examples of drive assemblies with ground detection systems according to the present disclosure have been illustrated and described herein, drive assemblies and corresponding detection systems may take a wide variety of other forms, as desired or beneficial for a particular application, without departing from the scope of the present disclosure.

INDUSTRIAL APPLICABILITY

The present disclosure is applicable to battery-powered children's ride-on vehicles.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations of features, functions, elements and/or properties that may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A children's ride-on vehicle, comprising:
a body having at least one seat sized for a child;
a plurality of wheels rotatably coupled to the body and adapted to contact a ground surface, wherein the plurality of wheels includes at least one steerable wheel and at least one driven wheel;
a steering assembly comprising a steering mechanism adapted to receive steering inputs from a child sitting on the at least one seat, and a steering linkage adapted to convey the steering inputs to the at least one steerable wheel; and
a drive assembly adapted to selectively drive the rotation of the at least one driven wheel in a plurality of drive configurations, wherein the drive assembly comprises:
a motor assembly comprising at least one electric motor,
at least one user input device positioned to receive inputs from a child sitting on the at least one seat and adapted to selectively actuate the motor assembly,
a battery assembly including at least one battery adapted to selectively energize the motor assembly, and
a ground detection system adapted to detect when at least one of the plurality of wheels loses contact with the ground surface, wherein the drive assembly is adapted to restrict driving of the at least one driven wheel to a subset of the plurality of drive configurations when the ground detection system detects loss of contact of the at least one of the plurality of wheels with the ground surface, and wherein the plurality of drive configurations includes at least one drive configuration that is not in the subset of the plurality of drive configurations;
wherein the ground detection system includes at least one switch adapted to be selectively configured between a first position and a second position, and further wherein the ground detection system is adapted to selectively configure the switch between the first position and the second position responsive to whether the at least one of the plurality of wheels is in contact with the ground surface, or loses contact with the ground surface, respectively;
wherein the steering assembly includes at least one spindle that rotatably couples the at least one of the plurality of wheels to the body;

wherein the at least one spindle includes an end portion that rotatingly supports the at least one of the plurality of wheels, and wherein the at least one spindle is configured to move between a retracted position, in which the end portion is adjacent to the body, and an extended position, in which the end portion is spaced from the body relative to the retracted position;

wherein the steering assembly includes at least one bias assembly adapted to urge the at least one spindle toward the extended position; and wherein the at least one spindle is operatively connected to the at least one switch such that the at least one switch is in the first position when the spindle is in the retracted position, and the at least one switch is in the second position when the spindle is in the extended position.

2. A children's ride-on vehicle, comprising:
a body having at least one seat sized for a child;
a plurality of wheels rotatably coupled to the body and adapted to contact a ground surface, wherein the plurality of wheels includes at least one steerable wheel and at least one driven wheel;
a steering assembly comprising a steering mechanism adapted to receive steering inputs from a child sitting on the at least one seat, and a steering linkage adapted to convey the steering inputs to the at least one steerable wheel; and
a drive assembly adapted to selectively drive the rotation of the at least one driven wheel in a plurality of drive configurations, wherein the drive assembly comprises:
a motor assembly comprising at least one electric motor,
at least one user input device adapted to receive user inputs selecting from the plurality of drive configurations,
a battery assembly including at least one battery adapted to selectively energize the motor assembly, and
a ground detection system including at least a pair of ground detection assemblies that are each operatively coupled to a different respective wheel of the plurality of wheels to detect when the respective wheel loses contact with the ground surface, wherein the drive assembly is adapted to restrict driving of the at least one driven wheel in an energized configuration when at least one of the pair of ground detection assemblies detects loss of contact of the respective wheel with the ground surface, the respective wheel configured to move relative to the body between a first wheel position when the respective wheel is in contact with the ground surface, and a second wheel position when the respective wheel loses contact with the ground surface, and wherein the ground detection system is configured to detect when the respective wheel is in the second wheel position.

3. The children's ride-on vehicle of claim 2, wherein the drive assembly is adapted to restrict driving of the at least one driven wheel in an energized configuration when both of the pair of ground detection assemblies detects that the respective wheel is in the second wheel position.

4. The children's ride-on vehicle of claim 2, wherein the drive assembly is adapted to be selectively configurable within the plurality of drive configurations when the ground detection system detects that the respective wheel is in the first wheel position.

5. A children's ride-on vehicle, comprising:
a body having at least one seat sized for a child;
a plurality of wheels rotatably coupled to the body and adapted to contact a ground surface, wherein the plurality of wheels includes at least one steerable wheel and at least one driven wheel;
a steering assembly comprising a steering mechanism adapted to receive steering inputs from a child sitting on the at least one seat, and a steering linkage adapted to convey the steering inputs to the at least one steerable wheel; and
a drive assembly adapted to selectively drive the rotation of the at least one driven wheel in a plurality of drive configurations, wherein the drive assembly comprises:
a motor assembly comprising at least one electric motor,
at least one user input device adapted to receive user inputs selecting from the plurality of drive configurations,
a battery assembly including at least one battery adapted to selectively energize the motor assembly, and
a ground detection system having a pair of ground detection assemblies, each being operatively connected to a different respective wheel of the plurality of wheels, the respective wheel being configured to move relative to the body between a first wheel position when the respective wheel is in contact with the ground surface, and a second wheel position when the respective wheel loses contact with the ground surface, the ground detection system further including at least one switch adapted to be configured between a first position, which corresponds to the respective wheel being in the first wheel position, and a second position, which corresponds to the respective wheel being in the second wheel position, wherein when the at least one switch is in the first position, the drive assembly is adapted to selectively be configured to rotationally drive the at least one driven wheel in any of the plurality of drive configurations, and wherein when the at least one switch is in the second position, the drive assembly is adapted to restrict driving of the at least one driven wheel in an energized configuration.

6. The children's ride-on vehicle of claim 5, wherein the at least one switch is adapted to be automatically configured to the second position responsive to the respective wheel being in the second wheel position, and wherein the at least one switch is adapted to automatically return to the first position when the respective wheel is in the first wheel position.

7. The children's ride-on vehicle of claim 5, wherein the at least one switch is adapted to complete a circuit when moved to the second position.

8. The children's ride-on vehicle of claim 5, wherein the steering assembly includes at least one spindle that rotatably couples the respective wheel to the body.

9. The children's ride-on vehicle of claim 8, wherein the at least one spindle includes an end portion that rotatingly supports the respective wheel, and wherein the at least one spindle is configured to move between a retracted position, in which the end portion is adjacent to the body, and an extended position in which the end portion is spaced from the body relative to the retracted position.

10. The children's ride-on vehicle of claim 9, wherein the steering assembly includes at least one bias assembly adapted to urge the at least one spindle toward the extended position.

11. The children's ride-on vehicle of claim 10, wherein the at least one spindle is operatively connected to the at least one switch such that the at least one switch is in the first position when the spindle is in the retracted position, and the at least one switch is in the second position when the spindle is in the extended position.

12. A children's ride-on vehicle, comprising:
- a body having at least one seat sized for a child;
- a plurality of wheels rotatably coupled to the body and adapted to contact a ground surface, wherein the plurality of wheels includes at least one steerable wheel and at least one driven wheel;
- a steering assembly comprising a steering mechanism adapted to receive steering inputs from a child sitting on the at least one seat, and a steering linkage adapted to convey the steering inputs to the at least one steerable wheel; and
- a drive assembly adapted to selectively drive the rotation of the at least one driven wheel in a plurality of drive configurations, wherein the drive assembly comprises:
  - a motor assembly comprising at least one electric motor,
  - at least one user input device positioned to receive inputs from a child sitting on the at least one seat and adapted to selectively actuate the motor assembly,
  - a battery assembly including at least one battery adapted to selectively energize the motor assembly, and
  - a ground detection system adapted to detect when at least one of the plurality of wheels loses contact with the ground surface, wherein the drive assembly is adapted to prevent driving the at least one driven wheel in one or more drive configurations of the plurality of drive configurations when the ground detection system detects loss of contact of the at least one of the plurality of wheels with the ground surface;
- wherein the at least one of the plurality of wheels is configured to move relative to the body between a first wheel position when the at least one of the plurality of wheels is in contact with the ground surface, and a second wheel position when the at least one of the plurality of wheels loses contact with the ground surface, and wherein the ground detection system detects loss of contact by detecting when the at least one of the plurality of wheels is in the second wheel position.

13. The children's ride-on vehicle of claim 12, wherein when the ground detection system detects loss of contact of the at least one of the plurality of wheels with the ground surface, the drive assembly is adapted to permit driving the at least one driven wheel in a subset of the plurality of drive configurations.

14. The children's ride-on vehicle of claim 13, wherein the at least one user input device includes at least one configuration input device adapted to receive user inputs selecting amongst the plurality of drive configurations.

15. The children's ride-on vehicle of claim 14, wherein the drive assembly is adapted to restrict the plurality of drive configurations to the subset of the plurality of drive configurations when the ground detection system detects loss of contact of the at least one of the plurality of wheels with the ground surface regardless of a user input selecting a drive configuration that is in the plurality of drive configurations but not in the subset of the plurality of drive configurations.

16. The children's ride-on vehicle of claim 12, wherein the drive assembly is adapted to be selectively configured within any of the plurality of drive configurations when the ground detection system does not detect loss of contact of the at least one of the plurality of wheels with the ground surface.

17. The children's ride-on vehicle of claim 13, wherein the plurality of drive configurations and the subset of the plurality of drive configurations include a de-energized configuration in which the motor assembly is restricted from being actuated by the at least one user input device.

18. The children's ride-on vehicle of claim 17, wherein the plurality of drive configurations further includes at least one energized configuration in which the motor assembly is configured to be actuated by the at least one user input device, and wherein the subset of the plurality of drive configurations does not include an energized configuration.

19. The children's ride-on vehicle of claim 13, wherein the plurality of wheels includes at least a first wheel and a second wheel, and wherein the ground detection system is adapted to detect when at least one of the first wheel and the second wheel contacts the ground surface.

20. The children's ride-on vehicle of claim 19, wherein the first wheel and the second wheel are steerable wheels.

21. The children's ride-on vehicle of claim 19, wherein the drive assembly is adapted to restrict driving of the at least one driven wheel to the subset of the plurality of drive configurations when the ground detection system detects loss of contact of both the first wheel and the second wheel with the ground surface.

22. The children's ride-on vehicle of claim 19, wherein the drive assembly is adapted to be selectively configurable within the plurality of drive configurations when the ground detection system does not detect loss of contact of the first wheel and the second wheel with the ground surface.

23. The children's ride-on vehicle of claim 13, wherein the ground detection system includes at least one switch adapted to be selectively configured between a first position and a second position, and further wherein the ground detection system is adapted to selectively configure the switch between the first position and the second position responsive to whether the at least one of the plurality of wheels is in contact with the ground surface, or loses contact with the ground surface, respectively.

24. The children's ride-on vehicle of claim 23, wherein when the at least one switch is in the first position, the drive assembly is adapted to selectively be configured to rotationally drive the at least one driven wheel in any of the plurality of drive configurations, and wherein when the at least one switch is in the second position, the drive assembly is adapted to restrict driving of the at least one driven wheel to the subset of the plurality of drive configurations.

25. The children's ride-on vehicle of claim 24, wherein the drive assembly is adapted to automatically configure the at least one switch to the second position responsive to loss of contact of the at least one of the plurality of wheels with the ground surface.

26. The children's ride-on vehicle of claim 25, wherein the at least one switch is biased to automatically return to the first position when the at least one of the plurality of wheels contacts the ground surface.

27. The children's ride-on vehicle of claim 23, wherein the at least one switch is adapted to complete a circuit when in the second position.

28. The children's ride-on vehicle of claim 23, wherein the at least one switch is adapted to open a circuit when in the second position.

29. The children's ride-on vehicle of claim 23, wherein the steering assembly includes at least one spindle that rotatably couples the at least one of the plurality of wheels to the body.

30. The children's ride-on vehicle of claim 29, wherein the at least one spindle includes an end portion that rotatingly supports the at least one of the plurality of wheels, and wherein the at least one spindle is configured to move between a retracted position, in which the end portion is adjacent to the body, and an extended position, in which the end portion is spaced from the body relative to the retracted position.

31. The children's ride-on vehicle of claim 30, wherein the steering assembly includes at least one bias assembly adapted to urge the at least one spindle toward the extended position.

* * * * *